(12) United States Patent
Zhang et al.

(10) Patent No.: US 11,811,292 B1
(45) Date of Patent: Nov. 7, 2023

(54) TUMBLER-TYPE VEHICLE-MOUNTED FLYWHEEL ENERGY STORAGE DEVICE WITH FIVE-DEGREE-OF-FREEDOM MAGNETIC SUSPENSION SUPPORT

(71) Applicant: JIANGSU UNIVERSITY, Zhenjiang (CN)

(72) Inventors: Weiyu Zhang, Zhenjiang (CN); Lindong Zhang, Zhenjiang (CN); Huangqiu Zhu, Zhenjiang (CN); Long Shan, Zhenjiang (CN); Juexin Yu, Zhenjiang (CN); Jianping Wang, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 169 days.

(21) Appl. No.: 17/630,939

(22) PCT Filed: Mar. 26, 2021

(86) PCT No.: PCT/CN2021/083164
§ 371 (c)(1),
(2) Date: Jan. 28, 2022

(87) PCT Pub. No.: WO2022/193352
PCT Pub. Date: Sep. 22, 2022

(30) Foreign Application Priority Data

Mar. 17, 2021 (CN) .......................... 202110286861.0

(51) Int. Cl.
*H02K 7/09* (2006.01)
*H02K 7/02* (2006.01)

(52) U.S. Cl.
CPC ............... *H02K 7/025* (2013.01); *H02K 7/09* (2013.01)

(58) Field of Classification Search
CPC .. H02K 7/02; H02K 7/025; H02K 7/09; H02J 15/007
USPC .................................. 310/74, 90.5; 700/295
See application file for complete search history.

(56) References Cited

U.S. PATENT DOCUMENTS 5,760,506 A    6/1998 Ahlstrom et al.

FOREIGN PATENT DOCUMENTS

| CN | 105782242 A | 7/2016 |
| CN | 109378930 A | 2/2019 |
| CN | 109831056 A | 5/2019 |

(Continued)

*Primary Examiner* — Terrance L Kenerly
(74) *Attorney, Agent, or Firm* — Bayramoglu Law Offices LLC

(57) ABSTRACT

A tumbler-type vehicle-mounted flywheel energy storage device with five-degree-of-freedom magnetic suspension support for an electric vehicle is provided. A flywheel is formed into a bowl by a metal flywheel rotor and a composite material ring by interference fit. The metal flywheel rotor comprises an upper-section ring, a mid-section hollow hemisphere, and a lower-section ring. The composite material ring is closely fitted outside the upper-section ring to form a bowl-shaped bowl opening part. An annular axial thrust disc protrudes inward in a radial direction from an inner wall on a bottom end of the upper-section ring. An area above the axial thrust disc is a bowl opening empty slot layer, and an area below the axial thrust disc is a sphere empty slot layer and a bowl bottom empty slot layer in sequence, which form an inner cavity of the flywheel. A supporting frame is fitted in an inner stator.

10 Claims, 7 Drawing Sheets

(56) References Cited

FOREIGN PATENT DOCUMENTS

| | | |
|---|---|---|
| CN | 111435805 A | 7/2020 |
| DE | 19938079 C1 | 11/2000 |

TUMBLER-TYPE VEHICLE-MOUNTED FLYWHEEL ENERGY STORAGE DEVICE WITH FIVE-DEGREE-OF-FREEDOM MAGNETIC SUSPENSION SUPPORT

CROSS REFERENCE TO THE RELATED APPLICATIONS

This application is the national phase entry of International Application No. PCT/CN2021/083164, filed on Mar. 26, 2021, which is based upon and claims priority to Chinese Patent Application No. 202110286861.0, filed on Mar. 17, 2021, the entire contents of which are incorporated herein by reference.

TECHNICAL FIELD

The present invention relates to the field of vehicle-mounted flywheel energy storage devices (also referred to as flywheel batteries) for electric vehicles, and specifically to a vehicle-mounted energy storage device with five-degree-of-freedom magnetic suspension support.

BACKGROUND

As a green energy storage component developed in recent years, a flywheel energy storage device has the advantages of high specific power, high charging and discharging efficiency, low noise pollution, and long life cycle, and is one of the ideal power batteries for electric vehicles. However, the main challenges that restrict the development of the flywheel energy storage devices for electric vehicles are technical difficulties such as large space occupancy, the need to improve stability, high costs, the difficulty in guaranteeing safety performance, and complex control means.

Spatial arrangement issue: topological structures of conventional flywheel energy storage devices are generally that a flywheel, a motor, and a magnetic bearing are arranged around a "long main shaft of inertia," so that the axial length is large, which is unfavorable for increasing the critical speed of the flywheel; moreover, the conventional flywheel energy storage devices have the disadvantages such as low integration level and low space utilization rate and are unfavorable for promotion and application thereof in electric vehicles.

Stability issue: due to the special vehicle-mounted environment, flywheels are usually affected by vehicle driving conditions (such as start, acceleration and deceleration, turning, and uphill and downhill) and road conditions with different levels of bumpiness, which intensifies the gyroscopic effect and unbalanced vibration thereof. However, flywheel topologies in existing flywheel energy storage devices are usually solid or hollow cylindrical, spherical, or disc-shaped structures. The centers of gravity of these topological structures are basically located at geometrical centers of the entire flywheels. When the flywheels operate and are affected by external interference factors such as vehicle driving conditions and road conditions, the flywheels easily lose stability, and higher requirements are raised for the structural design of magnetic bearings and the magnetic suspension control strategy.

Cost issue: considering the actual application scenarios of vehicle-mounted flywheel energy storage devices, processing costs of the devices need to be reduced while meeting specific energy storage advantages to realize large-scale product application. Generally, to meet system energy storage requirements, flywheels are mostly made of high-toughness composite materials, but such materials are not economical in price and do not meet low cost goals. In contrast, metal materials have the advantage of low prices, but have multiplied weight and volume with the same energy storage capacity, and thus are not suitable for vehicle-mounted occasions with high integration level. As a result, it's important to fully explore the advantages of the two kinds of materials and reasonably design the ratio of the composite material and the metal material to guarantee the energy storage performance and cost of the flywheels.

Safety issue: safe containers of conventional flywheel energy storage devices are mostly single-layer vacuum protective shields, which have poor airtightness and do not sufficiently consider safety hazards caused to the system by the occurrence of ultimate destruction of flywheels.

The document with Chinese Patent Application No. 201910072060.7 and entitled "VIRTUAL SHAFT-TYPE MAGNETIC LEVITATION FLYWHEEL ENERGY STORAGE DEVICE FOR ELECTRIC VEHICLE" relates to a separate five-degree-of-freedom magnetic bearing for supporting a flywheel rotor, where a radial six-pole hybrid magnetic bearing is used to realize control of two-degree-of-freedom radial translation and two-degree-of-freedom radial torsion, while an axial hybrid magnetic bearing having an embedded double permanent magnet structure is used for single-degree-of-freedom axial control, which can realize a large axial bearing force. However, although the topology design scheme of the device reduces the axial volume of the flywheel energy storage device to achieve a high integration level based on the "embedding" idea, embedding of part of the magnetic bearing causes processing difficulty of the flywheel rotor and high maintenance costs, and more importantly causes stress concentration in the embedded part of the flywheel, and thus energy storage characteristics and safety characteristics are not guaranteed. Further, the metal flywheel in the device has a cylindrical disc design, which has low system economy and poor self-stabilizing effect while realizing specific energy storage capacity. Moreover, the disc-shaped structure has a stronger gyroscopic effect than a cylindrical flywheel in the high-speed environment, thus increasing the control difficulty thereof. Besides, the axial magnetic bearing of the device uses the double permanent magnet ring structure to offset the weight of the flywheel, which inevitably produces flux leakage and causes increase of the system energy consumption. Moreover, magnetic coupling does not occur in the entire five-degree-of-freedom magnetic bearing, and magnetic separation aluminum rings are used in place of air gap magnetic barriers. Although the desired effect can be achieved, the eddy current loss of the system is also increased.

SUMMARY

The objective of the present invention is to provide, in order to overcome the defects of the existing technical solutions, a tumbler-type vehicle-mounted flywheel energy storage device with five-degree-of-freedom magnetic suspension support having high integration level, natural self-stability, low economic costs, energy storage advantages, and high safety performance. The center of gravity of the entire flywheel is changed by designing the topology of the flywheel, and a flywheel topology similar to a "tumbler" is designed so as to have the natural self-balance advantage of the flywheel.

The technical solution adopted by the tumbler-type vehicle-mounted flywheel energy storage device with fivedegree-of-freedom magnetic suspension support in the present invention is: having a shell cavity and a five-degree-of-freedom magnetic bearing concentrically disposed within the shell cavity, wherein the five-degree-of-freedom magnetic bearing has an outer rotor, an inner stator, coils, and permanent magnets, a flywheel is used as the outer rotor, the inner stator is concentrically fitted inside the flywheel, the flywheel is formed into a bowl by a metal flywheel rotor and a composite material ring by means of interference fit, the metal flywheel rotor comprises an upper-section ring, a mid-section hollow hemisphere, and a lower-section ring, the composite material ring is closely fitted outside the upper-section ring to form a bowl-shaped bowl opening part, the mid-section hollow hemisphere forms a bowl-shaped bowl bottom part, and the lower-section ring forms a bowl-shaped bowl base part; an annular axial thrust disc protrudes inward in a radial direction from an inner wall on a bottom end of the upper-section ring, an area above the axial thrust disc is a bowl opening empty slot layer, an area below the axial thrust disc is a sphere empty slot layer and a bowl bottom empty slot layer in sequence, the bowl opening empty slot layer, the sphere empty slot layer, and the bowl bottom empty slot layer are connected from top to bottom to form an inner cavity of the flywheel, a supporting frame and the inner stator, the coils, and the permanent magnets of the five-degree-of-freedom magnetic bearing are accommodated in the inner cavity of the flywheel, the supporting frame comprises an upper cylinder and a lower disc, and has an upper end fixedly connected to the shell cavity, and is fixedly fitted in the inner stator; an outer diameter of the lower-section ring is smaller than an inner diameter of the upper-section ring, a solid bowl base central shaft is right in the middle of the lower-section ring, a bowl base annular cavity is formed between the bowl base central shaft and the lower-section ring, and a drive motor is accommodated in the bowl base annular cavity.

Further, the composite material ring is flush with an upper surface of the upper-section ring of the metal flywheel rotor, an outer diameter of the composite material ring is equal to an outer diameter of the mid-section hollow hemisphere, so that an outer wall of the composite material ring is tangent to an outer spherical surface of the mid-section hollow hemisphere, a spherical wall thickness of the hollow hemisphere is equal to a thickness of the bowl opening part; a lower end surface of the composite material ring is flush with an upper end surface of the mid-section hollow hemisphere, and a mass ratio of the composite material ring to the metal flywheel rotor 21 is 1:3.

Further, the inner stator of the five-degree-of-freedom magnetic bearing comprises a radial stator, an axial stator, and a torsional stator, the radial stator is accommodated in the bowl opening empty slot layer, a yoke of the radial stator is closely fitted outside the upper cylinder, an upper ring permanent magnet is closely attached to an outer wall of the yoke; an upper radial stator ring fixedly connected to the shell cavity protrudes upward in an axial direction from an upper end surface of the radial stator, and a radial control coil is wound around stator poles of the radial stator; the torsional stator is below the radial stator, a lower ring permanent magnet is fitted outside an outer wall of a yoke of the torsional stator, an inner wall of the yoke is closely nested with the upper cylinder, a torsional control coil is wound around stator poles of the torsional stator, and the torsional control coil is accommodated in the bowl bottom empty slot layer; the axial stator has an upper stator salient pole and a lower stator salient pole, an outer side surface of a pole arc end of the upper stator salient pole is a cylindrical surface, an outer side surface of a pole arc end of the lower stator salient pole is a hemispherical surface, the axial thrust disc is located between the upper stator salient pole and the lower stator salient pole, and the outer side surface of the pole arc end of the lower stator salient pole shares a sphere center with a slot surface of the sphere empty slot layer; and an upper axial control coil and a lower axial control coil are placed inside the axial stator.

The beneficial effects of the present invention as compared with the prior art are as follows:

1. getting beyond the conventional flywheel energy storage system structure in which a magnetic bearing and a motor are arranged around a main shaft of inertia, the present invention is a shaftless flywheel energy storage topology in which both a magnetic bearing and a motor are "internally disposed" (not embedded, not integral with a flywheel) in the flywheel, which can effectively reduce the axial length of the entire device while not affecting the magnetic path distribution and energy storage effect, thereby improving the integration level.

2. In terms of stabilizing performance, the flywheel rotor topology designed in the present invention is a bowl-shaped structure of a composite material combined with a metal material. The entire flywheel rotor is internally hollowed out to have the five-degree-of-freedom magnetic bearing internally disposed therein, the outer side of the rim of the upper end (bowl opening) uses a carbon fiber composite material in place of the original metal material, the lower end (bowl bottom) is a hollow hemisphere, and the bottom (bowl base) is embedded with a drive motor, so as to form a shape feature of being "light on the top and heavy on the bottom" and enable the center of gravity of the flywheel to be concentrated at the bowl bottom, thereby realizing natural self-balance of the flywheel using the principle that the lower the center of gravity, the more stable the "tumbler" (realizing self-stabilization using a gyroscopic effect at low speed and inhibiting the gyroscopic effect at high speed).

3. In terms of energy storage performance and cost performance, the composite material in the flywheel rotor designed in the present invention not only reduces the weight at the bowl opening, but also improves the energy storage capacity and specific energy of the entire system, and produces an energy storage effect much better than a pure metal flywheel in spite of higher costs than the pure metal flywheel. Similarly, as compared with a pure composite material, the energy storage performance is not so good, but a lot of costs can be saved. As a result, taking both energy storage performance and costs into account, the composite material combined with the metal material makes the flywheel have high cost performance. Further, as compared with a flywheel of the same size having a main shaft of inertia, the flywheel rotor designed in the present invention has a shaftless structure (namely, having no main shaft of inertia), which enables the overall energy density to be multiplied.

4. In terms of mechanical properties, the bowl-shaped topology of the flywheel rotor can increase the form factor of the flywheel and improve the mechanical properties thereof, which is manifested as uniform stress distribution and high material utilization rate, thereby extending the life cycle of the flywheel and reducing subsequent safety maintenance costs.

5. The drive motor at the bowl base of the bowl-shaped topology of the flywheel rotor is a lightweight and efficient outer rotor brushless direct current motor, which is simple in structure and easy to maintain, employs square wave drive so that a large starting torque can be generated, and is suitable for such application objects as flywheels having high requirements on the starting torque. A permanent magnet patch of the motor is designed as an arc structure so as to have a smaller air gap with the stator, thereby ensuring that the operation efficiency of the motor does not decay at high temperature while obtaining a larger torque. Meanwhile, the motor coil is wound from a thick silver wire to realize low copper consumption.

6. The shell wall designed in the present invention is a double-layer structure to improve bearing capacity of impact caused by ultimate destruction of the flywheel, thereby having better sealing performance and safety. The inner layer is a honeycomb shield made of a glass fiber reinforced porous material which has buffering and noise reduction functions; the outer layer is made of an aluminum magnesium alloy which has lower costs, lighter weight, and greater stiffness and rigidity than common alloys and steel, and is more suitable for vehicle-mounted environments while ensuring safety. The shell wall uses a "double concave ring," and heat dissipation slots are arranged on the periphery of the outer side of the upper end cover to reduce heat concentration during high-speed operation of the rotor, which helps to extend the life cycle thereof. Further, the vacuum environment formed in the highly sealed state can minimize the air friction loss of the flywheel, which is more beneficial to high-speed operation of the flywheel, thereby improving energy storage capacity.

7. The five-degree-of-freedom magnetic bearing designed in the present invention is a composite magnetic hearing where axial, radial, and torsional biased fluxes are reused, the entire magnetic suspension support system uses only two annular radially magnetized permanent magnets to realize the function of offsetting the gravity of the flywheel and providing two-degree-of-freedom radial, two-degree-of-freedom torsional, and single-degree-of-freedom axial biased fluxes, so that the volume of the magnetic bearing is more integrated. A mature inverter control technology is used to drive radial and torsional control fluxes, the axial control flux uses two sets of coils to realize more stable double-air-gap axial translational control, and the entire magnetic bearing uses a small number of permanent magnets and control coils, so that the energy consumption and costs are also reduced while achieving larger bearing capacity. Air gap magnetic barriers are used in place of magnetic separation aluminum rings in the five-degree-of-freedom magnetic bearing, so that eddy current loss is minimized.

8. Sensor holes are all externally provided on the shell, where radial sensor holes pass through the double-layer shell wall to detect the radial translational offset of the flywheel, axial sensor holes extend from the upper end cover to the supporting frame to detect the axial translational offset of the flywheel, and torsional sensor holes pass through fixing keys on the upper end cover to detect the torsional offset of the flywheel, thereby facilitating mounting and maintenance.

Figure 1:
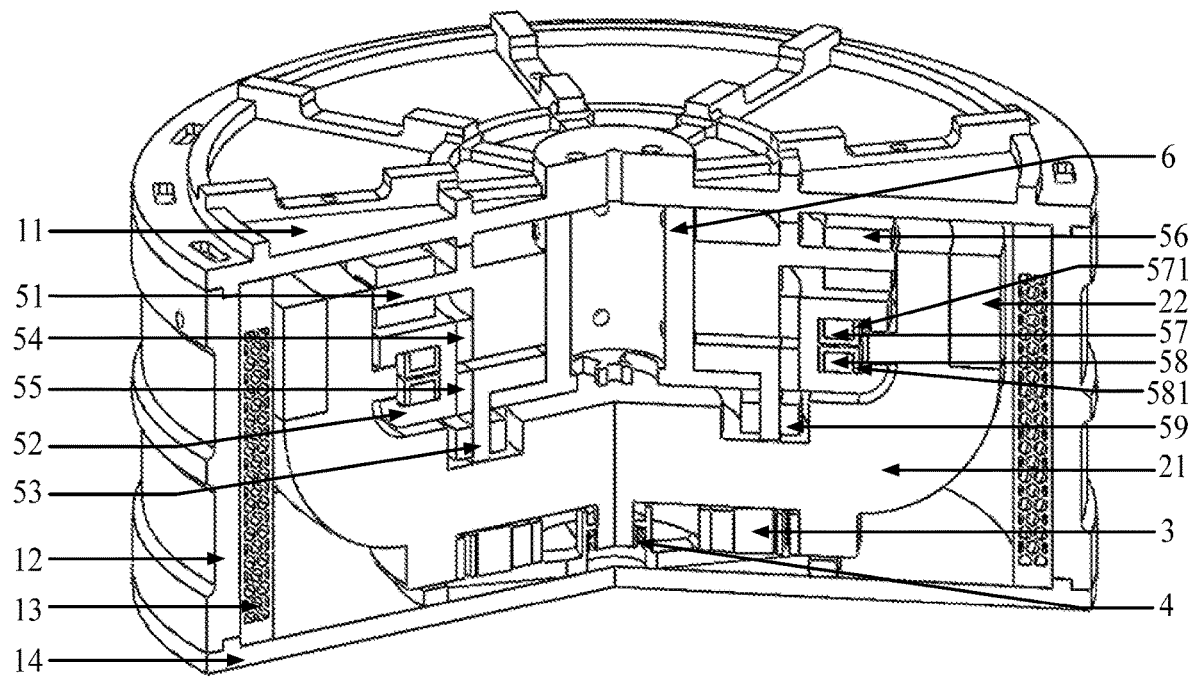
FIG. 1 is a structural perspective view of a tumbler-type vehicle-mounted flywheel energy, storage device with five-degree-of-freedom magnetic suspension support in the present invention.

In the drawings: 3. drive motor; 4. auxiliary hearing; 6. supporting frame; 11. shell upper end cover; 12. shell outer layer wall; 13. shell inner layer honeycomb shield; 14. shell lower end cover; 21. metal flywheel rotor; 22. composite material ring; 31. motor supporting frame; 32. motor stator; 33. motor rotor; 34. motor permanent magnet patch; 35. motor coil; 51. radial stator; 52. axial stator; 53. torsional stator; 54. upper ring permanent magnet; 55. lower ring permanent magnet; 56. radial control coil; 57. upper axial control coil; 58. lower axial control coil; 59. torsional control coil; 61. radial control coil wiring outlet hole; 62. axial control coil wiring outlet hole; 63. torsional control coil wiring outlet hole; 64. lower axial sensor hole; 65. upper cylinder; 66. lower disc;

111. upper end cover cylindrical boss; 112. upper end cover inner ring; 113. upper end cover outer ring; 114. connecting body; 115. fixing key; 116. heat dissipation slot; 121. radial sensor hole; 122, heat dissipation concave ring; 211. bowl opening empty slot layer; 212. axial thrust disc; 213. sphere empty slot layer; 214. bowl bottom empty slot layer; 215. bowl base central shaft; 311. fixing hole; 511. upper radial stator ring; 571. upper coil rack; 581. lower coil rack;

1111, upper axial sensor hole; 1112. vacuumization hole; 1113. control coil bus outlet hole; 1151. torsional sensor hole.

DETAILED DESCRIPTION OF THE EMBODIMENTS

As shown in FIG, 1, the outermost part of the present invention is a shell cavity with a vacuum environment. The shell cavity comprises a shell upper end cover 11, a shell outer layer wall 12, a shell inner layer honeycomb shield 13, and a shell lower end cover 14. An upper end surface and a lower end surface of the shell outer layer wall 12 are respectively closely attached and fixedly connected to the shell upper end cover 11 and the shell lower end cover 14 by means of recesses provided on an upper end and a lower end. The lower end cover 14 is designed as a solid disc. A supporting frame 6, a drive motor 3, a flywheel, and an inner stator, coils, and permanent magnets of a five-degree-of-freedom magnetic bearing are concentrically arranged within the shell cavity. The supporting frame 6 has an upper end fixedly connected to the shell cavity, and is fixedly fitted in the inner stator to support the inner stator.

Figure 2:
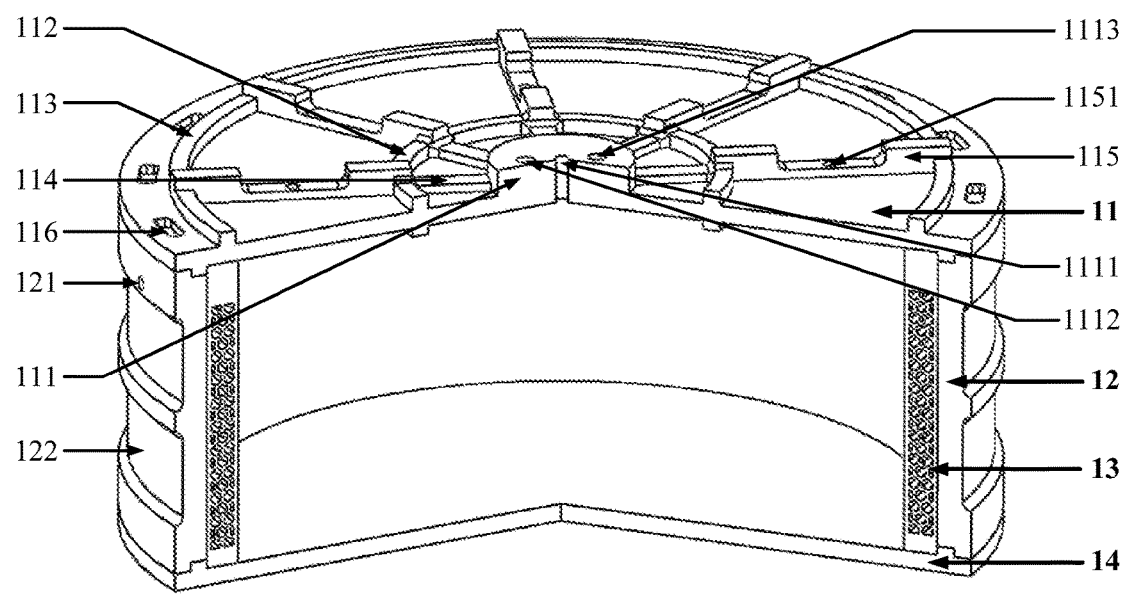
FIG. 2 is a structural sectional view of a shell cavity in FIG. 1.

Referring to FIG. 2 as well, the shell inner layer honeycomb shield 13 is coaxially fitted inside the shell outer layer wall 12, and an inner circumferential surface of the shell outer layer wall 12 is closely attached to an outer circumferential surface of the shell inner layer honeycomb shield 13. An outer circumferential surface of the shell outer layer wall 12 is provided with heat dissipation concave rings 122, the heat dissipation concave rings 122 are annular, two heat dissipation concave rings are disposed at an interval in an axial direction, and the two heat dissipation concave rings 122 are symmetrical from top to bottom. Heat dissipation slots 116 are uniformly arranged around an edge of an upper end surface of the upper end cover 11, and are used in combination with the heat dissipation concave rings 122 to realize heat dissipation during high-speed rotation of a flywheel rotor. Meanwhile, four radial sensor holes 121 are disposed on a sidewall of the shell outer layer wall 12. The four radial sensor holes 121 are arranged circumferentially at 90°, and communicate with the interior of the shell cavity through the shell inner layer honeycomb shield 13, to realize detection of a radial position.

The shell upper end cover 11 is provided with an upper end cover outer ring 113 and an upper end cover inner ring 112, where the upper end cover outer ring 113 is near the edge, and the upper end cover inner ring 112 is near the center. Both the upper end cover outer ring 113 and the upper end cover inner ring 112 protrude from an upper surface and a lower surface of the shell upper end cover 11. Fixing keys 115 are connected between the upper end cover inner ring 112 and the upper end cover outer ring 113, the fixing keys 115 are radially arranged, and a number of fixing keys 115 are uniformly disposed at an interval in a circumferential direction. Four torsional sensor holes 1151 arranged at 90° are disposed on the fixing keys 115, and the torsional sensor holes 1151 run from top to bottom to realize detection of a torsional position.

An upper end cover cylindrical boss 111 is disposed right in the middle of the interior of the upper end cover inner ring 112, that is, right in the middle of the shell upper end cover 11, where the end cover cylindrical boss 111 protrudes from an upper surface and a lower surface of the upper end cover 11. Radially disposed connecting bodies 114 are connected between the upper end cover cylindrical boss 111 and the upper end cover inner ring 112, and a number of connecting bodies 114 are uniformly arranged at an interval in the circumferential direction.

An upper axial sensor hole 1111 is provided right in the middle of the upper end cover cylindrical boss 111, and the upper axial sensor hole 1111 communicates with the interior of the shell cavity. Meanwhile, a control coil bus outlet hole 1113 and a vacuumization hole 1112 are provided on a raised surface of the upper end cover cylindrical boss 111, and both communicate with the interior of the shell cavity. The control coil bus outlet hole 1113 provides leading-out paths for control coils of the five-degree-of-freedom magnetic bearing. The vacuumization hole 1112 maintains a vacuum inside the shell cavity, and creates a vacuum environment for the entire flywheel energy storage device to reduce air friction loss.

A lower end surface of the upper end cover cylindrical boss 111 is fixedly connected to the upper end of the supporting frame 6 by means of bolts, the supporting frame 6 is accommodated right in the middle of the interior of the shell cavity, and a central axis of the supporting frame 6 is colinear with a central axis of the shell cavity.

An upper end surface and a lower end surface of the shell inner layer honeycomb shield 13 are correspondingly fixedly connected to a lower surface of the upper end cover outer ring 113 and an upper surface of the shell lower end cover 14 respectively by means of bolts.

Figure 3:
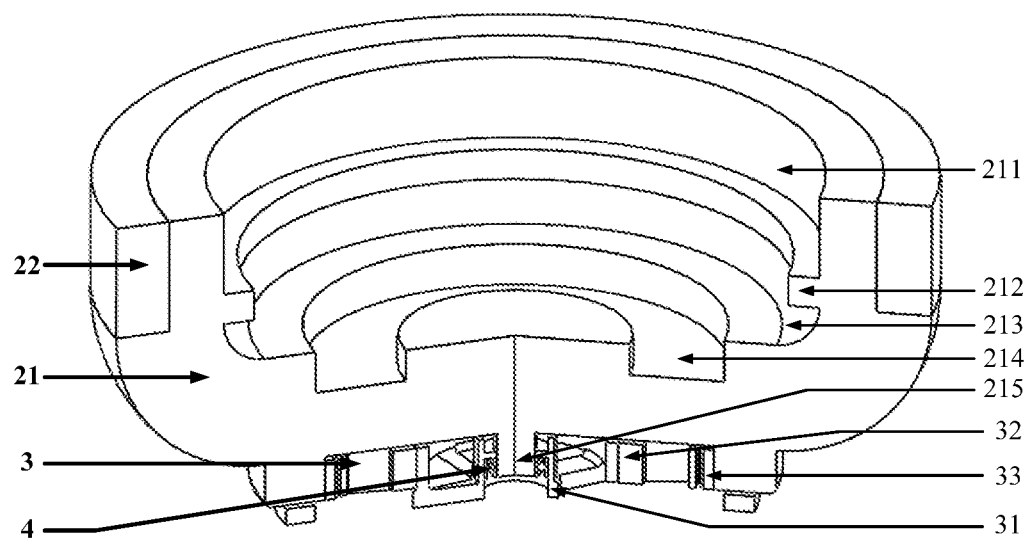
FIG. 3 is a sectional view of an assembled structure of the flywheel in FIG. 1 with a motor.

As shown in FIG. 3, the flywheel is formed of two major parts, namely, a metal flywheel rotor 21 and a composite material ring 22. The two form a whole by means of interference fit, so that the overall topology of the flywheel is bowl-shaped, where an interference of 0.03 mm needs to be reserved during fitting. The metal flywheel rotor 21 comprises three consecutive sections, namely, an upper section, a middle section, and a lower section. The upper section of the metal flywheel rotor 21 has a ring shape, the composite material ring 22 is closely fitted outside the upper-section ring, an outer sidewall of the upper-section ring and the composite material ring 22 form an integral ring by means of interference fit, an inner wall of the composite material ring 22 is closely attached to an outer wall of the upper-section ring of the metal flywheel rotor 21, and the composite material ring 22 is flush with an upper surface of the upper-section ring to form a bowl opening part of the flywheel. The middle section of the metal flywheel rotor 21 is a bowl bottom part of the flywheel, and has a hollow hemispherical shape. The lower section of the metal flywheel rotor 21 is a bowl base part of the flywheel and has a ring shape, the lower-section ring forms the bowl base part, and an outer diameter of the lower-section ring is smaller than an inner diameter of the kipper-section ring. A solid bowl base central shaft 215 is right in the middle of the lower-section ring, the bowl base central shaft 215 is formed by extending downward a center of a bottom wall of the mid-section hollow hemisphere, and an outer diameter of the bowl base central shaft 215 is far smaller than an inner diameter of the lower-section ring, so that a bowl base annular cavity is formed between the bowl base central shaft 215 and the lower-section ring and is used for accommodating and mounting the drive motor 3. The interior of the bowl opening part is connected to the interior of the bowl bottom part from top to bottom, but is not connected to the bowl base annular cavity of the bowl base part.

The composite material ring 22 is made of a carbon fiber composite material in place of the original metal material. An outer diameter of the composite material ring 22 is equal to an outer diameter of the hollow hemisphere in the bowl bottom part, so that an outer wall of the composite material ring 22 is tangent to an outer spherical surface of the hollow hemisphere in the bowl bottom part, and a spherical wail thickness of the hollow hemisphere is equal to a thickness of the bowl opening part. A lower end surface of the composite material ring 22 is flush with an upper end surface of the hollow hemisphere in the middle section. Due to the properties of the composite material and the metal material, a mass ratio of the composite material ring 22 to the metal flywheel rotor 21 is set to 1:3, so that the center of gravity of the flywheel is concentrated in the bowl bottom part, which not only can improve the overall energy storage performance of the device, but also can form a "tumbler" shape feature of being "light on the top and heavy on the bottom" to achieve better stability.

An axial thrust disc 212 protrudes inward in the radial direction from an inner wall on a bottom end of the upper-section ring of the metal flywheel rotor 21, and the axial thrust disc 212 is annular. A lower end surface of the axial thrust disc 212 is flush with a bottom surface of the upper-section ring of the metal flywheel rotor 21. An area above the axial thrust disc 212 is an area of a bowl opening empty slot layer 211, an area below the axial thrust disc 212 is an area of a sphere empty slot layer 213, and a sidewall of the sphere empty slot layer 213 has a spherical shape, which shares a sphere center with the hollow hemisphere in the bowl bottom part. An area right below the sphere empty slot layer 213 is an area of a bowl bottom empty slot layer 214. A solid middle circular boss protrudes upward right in the middle of a bottom of the bowl bottom empty slot layer 214, so that the bowl bottom empty slot layer 214 forms a ring shape. An outer diameter of the bowl bottom empty slot layer 214 is smaller than an outer diameter of the sphere empty slot layer 213 and is also smaller than an inner diameter of the axial thrust disc 212. The middle circular boss of the bowl bottom empty slot layer 214, a bottom wail of the bowl bottom empty slot layer 214 thereunder, and the bowl base central shaft 215 under the bottom wall form a whole. The bowl opening empty slot layer 211, the sphere empty slot layer 213, and the bowl bottom empty slot layer 214 are connected from top to bottom to form an inner cavity of the flywheel. The inner cavity is used for accommodating the supporting frame 6 and the inner stator, the coils, and the permanent magnets of the five-degree-of-freedom magnetic bearing. The inner cavity of the flywheel does not communicate with the bowl base annular cavity thereunder.

Figure 4:
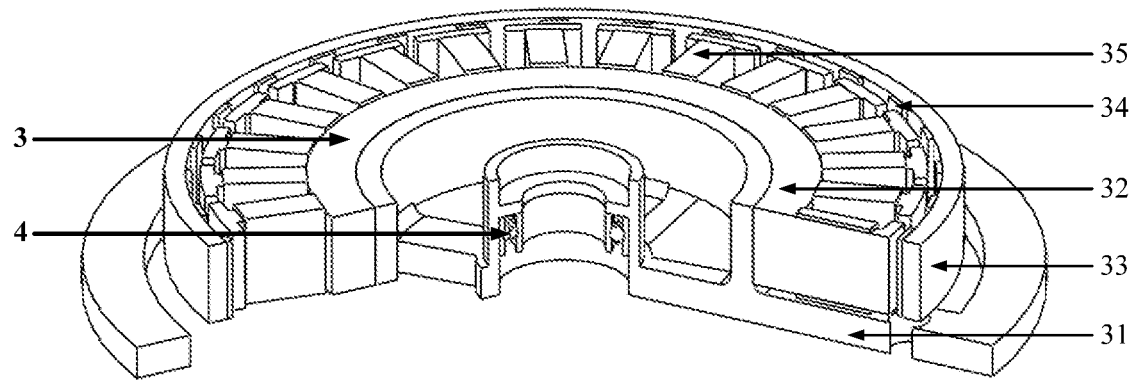
FIG. 4 is an enlarged assembled sectional view of the drive motor 3 in FIG. 3.
Figure 5:
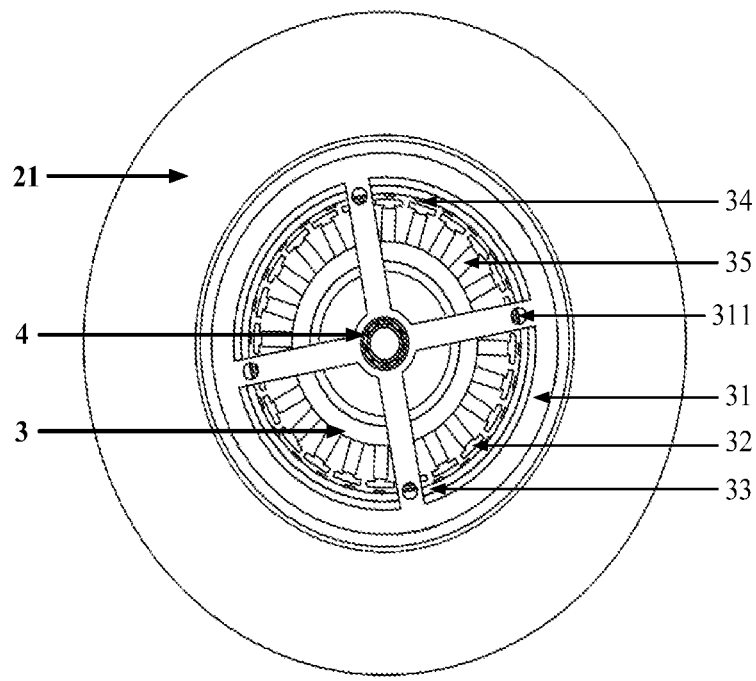
FIG. 5 is a bottom view of the assembled structure of the drive motor 3 in FIG. 4 with the flywheel.

As shown in FIG. 3, FIG. 4, and FIG. 5, the drive motor 3 is mounted in the lower-section bowl base annular cavity of the metal flywheel rotor 21. The drive motor 3 is designed as a 24-pole/28-slot brushless direct current motor and is coaxially mounted within the lower-section bowl base annular cavity. The drive motor 3 is formed of a motor rotor 33, motor permanent magnet patches 34, a motor stator 32, a motor coil 35, a motor supporting frame 31, and an auxiliary bearing 4. In the radial direction, the drive motor 3 has the motor rotor 33 on the outer side and the motor stator 32 on the inner side, 28 motor permanent magnet patches 34 are uniformly arranged in the circumferential direction on an inner wail of the motor rotor 33, a radial air gap of 0.5 mm is provided between a pole arc end surface of the motor stator 32 and an inner wall of the motor permanent magnet patch 34, the motor coil 35 is wound around stator poles of the motor stator 32, and a yoke of the motor stator 32 is closely and fixedly connected to the motor supporting frame 31. The auxiliary bearing 4 is embedded in the motor supporting frame 31, the motor supporting frame 31 is concentrically connected to the bowl base central shaft 215 by means of the auxiliary bearing 4 and concentrically fitted outside the bowl base central shaft 215. When the flywheel rotates, the motor supporting frame 31 remains stationary. In the axial direction, an axial clearance of 1-2 mm is left between the motor supporting frame 31 and the motor coil 35, upper and lower end surfaces of the motor rotor 33, the motor permanent magnet patches 34, and the motor stator 32 are flush, and an upper end surface of the motor supporting frame 31 is flush with an upper end surface of the motor stator 32.

An outer wall of the motor rotor 33 is closely nested with and fixedly connected to an inner wall of the lower-section ring of the metal flywheel rotor 21, so as to drive the flywheel to rotate. The motor supporting frame 31 is fitted outside the bowl base central shaft 215 by means of the auxiliary bearing 4, and a radial air gap of 0.25 mm is left between the auxiliary bearing 4 and the bowl base central shaft 215, so that the limiting case of radial displacement occurs when the flywheel rotates at high speed to ensure the safety of the whole device.

An axial clearance of 2-3 mm is left between the motor coil 35 and an upper end surface of the lower-section ring of the flywheel; a lower end surface of the lower-section ring of the flywheel is slightly higher than or flush with the lower end surface of the motor rotor 31. An axial clearance of 2-3 mm is left between the motor supporting frame 31 and the lower end surface of the lower-section ring of the howl base. Fixing holes 311 uniformly arranged in the circumferential direction are provided on a bottom of the motor supporting frame 31 and used for fixed connection to the shell lower end cover 14 by means of bolts, so as to fix the drive motor 3 and the shell lower end cover 14 of the shell cavity together.

Figure 6:
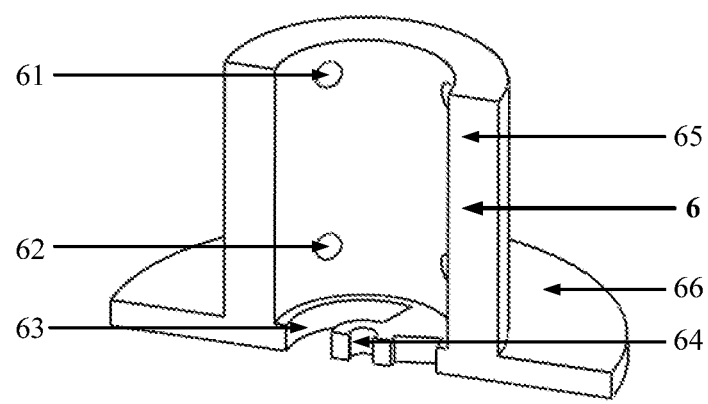
FIG. 6 is an enlarged structural sectional view of a supporting frame 6 in FIG. 1.

As shown in FIG. 6 and FIG. 2, the supporting frame 5 is formed of two parts, namely, an upper cylinder 65 and a lower disc 55, and has an upper end fixedly connected to the top center of the inner cavity of the flywheel, so that the supporting frame 6 is right in the middle of the inner cavity of the flywheel and used for supporting the inner stator of the five-degree-of-freedom magnetic bearing, and has the same central axis as the shell cavity and the five-degree-of-freedom magnetic hearing. Eight holes are uniformly arranged on a sidewall of the upper cylinder 65 in an upper layer and a lower layer and in the circumferential direction of each layer, which are respectively four radial control coil wiring outlet holes 51 in the upper layer and four axial control coil wiring outlet holes 52 in the lower layer. The path of the radial control coil wiring outlet hole 61 is located in a clearance formed between a radial stator 51 and the shell upper end cover 11, and the path of the axial control coil wiring outlet hole 62 is located in a clearance formed between the radial stator 51 and a torsional stator 53. A lower axial sensor hole 64 is arranged at the center of the lower disc 66, which, together with the upper axial sensor hole 1111 in FIG. 2, realizes detection of the axial position of the flywheel. Two fan-shaped torsional control coil wiring outlet holes 53 are arranged symmetrically on two sides of the lower axial sensor hole 64. The upper cylinder 65 has the same outer diameter as an outer diameter of the upper end cover cylindrical boss 111, is fixedly connected to the center of the bottom wall of the shell upper end cover 11, and is located right below the upper end cover cylindrical boss 111. An inner diameter of the upper cylinder 65 depends on the mass stiffness of a supported object while ensuring, normal operation of an axial sensor and convenient wiring of leads of the control coils of the five-degree-of-freedom magnetic bearing. Meanwhile, the supporting frame 6 uses a material like aluminum foam not having magnetic conductivity and hazing large stiffness, which does not affect the magnetic path distribution while achieving sufficient support strength.

Figure 7:
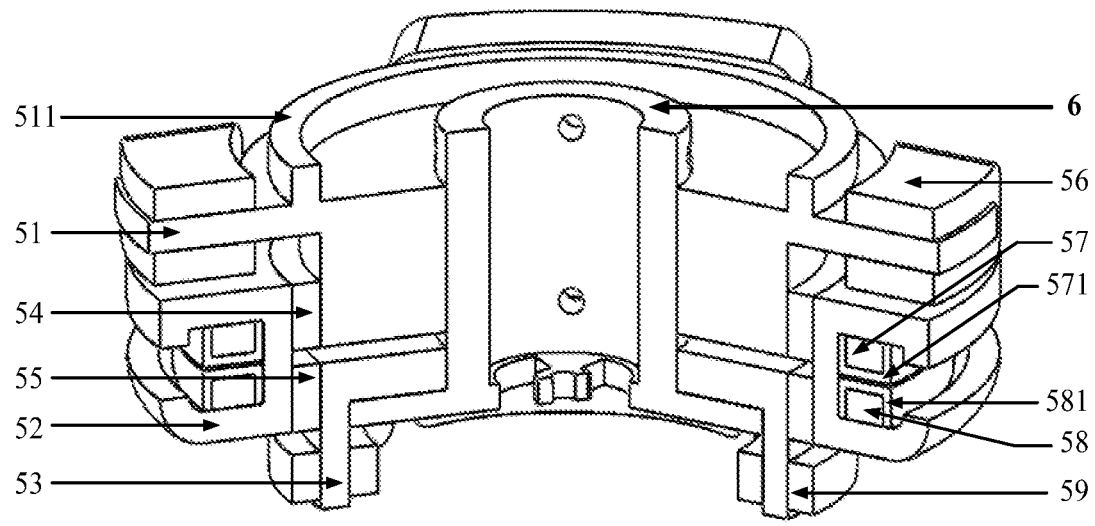
FIG. 7 is an assembly sectional view of a five-degree-of-freedom magnetic bearing in FIG. 1 with the flywheel removed.
Figure 8:
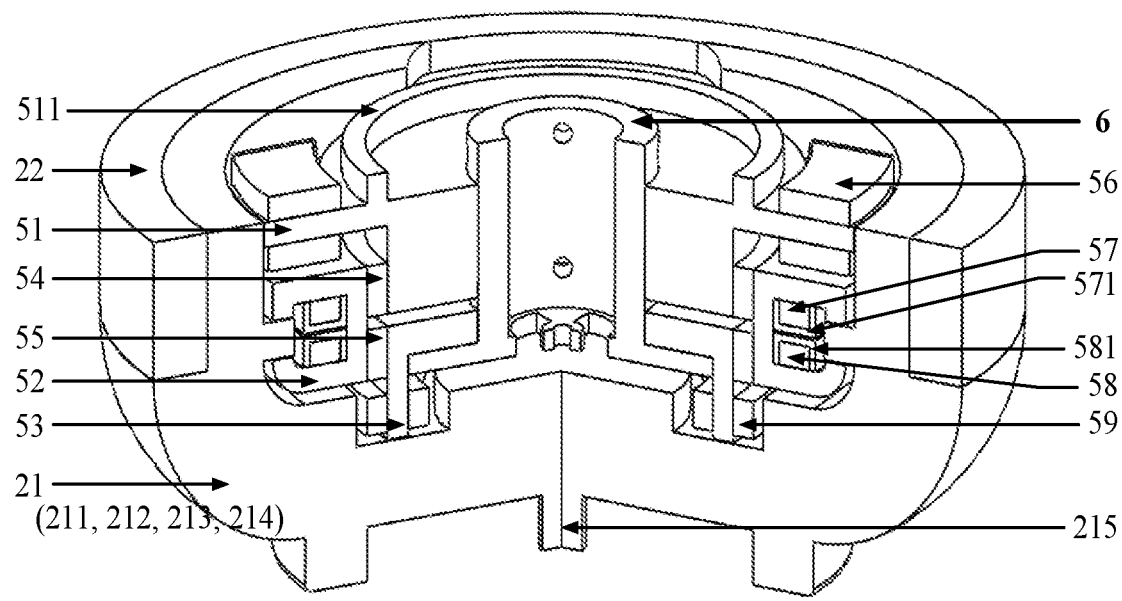
FIG. 8 is an assembly sectional view of the five-degree-of-freedom magnetic bearing in FIG. 1 including the flywheel.

As shown in FIG. 1, FIG. 7, and FIG. 8, the inner stator of the five-degree-of-freedom magnetic bearing is located between the supporting frame 6 and the upper and middle sections of the metal flywheel rotor 21, and is mounted in the bowl opening empty slot layer 211, the sphere empty slot layer 213, and the bowl bottom empty slot layer 214. The five-degree-of-freedom magnetic bearing is a conventional magnetic bearing, and comprises a two-degree-of-freedom radial magnetic bearing, a two-degree-of-freedom torsional magnetic bearing, and a single-degree-of-freedom axial magnetic bearing, where both the radial and torsional magnetic bearings are three-pole structures. The five-degree-of-freedom magnetic bearing includes the inner stator, an outer rotor, the coils, and the permanent magnets, uses the flywheel as the outer rotor, and is coaxially mounted with the supporting frame 6. The stator is the inner stator, and is concentrically fitted inside the outer rotor which is the flywheel, and the inner stator comprises the radial stator 51, an axial stator 52, and the torsional stator 53.

The yoke of the radial stator 51 is closely fitted outside the upper cylinder 65 of the supporting frame 6, and an inner wall of the yoke is closely nested with the upper cylinder 65. An upper end surface of the yoke of the radial stator 51 and upper end surfaces of stator poles thereof are flush and together form an upper end surface of the radial stator 51, and the upper end surface of the radial stator 51 is flush with an upper end surface of the upper-section bowl opening part of the metal flywheel rotor 21. An upper ring permanent magnet 54 is closely attached to an outer wall of the yoke of the radial stator 51, the stator pole of the radial stator 51 is above the upper ring permanent magnet 54, and a lower end surface of the yoke of the radial stator 51 is flush with a lower end surface of the upper ring permanent magnet 54. An upper radial stator ring 511 protrudes upward in the axial direction from the upper end surface of the radial stator 51. An inner diameter and an outer diameter of the upper radial stator ring 511 are equal to an inner diameter and an outer diameter of the upper end cover inner ring 112, and the upper radial stator ring 511 is fixedly connected to the upper end cover inner ring 112 by means of bolts, so as to fix the stator part of the five-degree-of-freedom magnetic bearing and the shell cavity. A radial air gap of 0.5 mm is left between a pole arc end surface of the radial stator 51 and an inner sidewall of the upper-section bowl opening part of the metal flywheel rotor 21, a radial control coil 56 is wound around the stator poles of the radial stator 51, and the radial control coil 56 does not make contact with both the shell upper end cover 11 and the axial stator 52. The radial stator 51 and the radial control coil 56 are accommodated in the area of the bowl opening empty slot layer 211.

The torsional stator 53 is below the radial stator 51, a lower ring permanent magnet 55 is fitted outside an outer wall of a yoke of the torsional stator 53, which is closely attached to an inner sidewall surface of the lower ring permanent magnet 55, and an inner wall of the yoke is closely nested with the upper cylinder 65 in the supporting frame 6. An upper end surface of the yoke of the torsional stator 53 is flush with an upper end surface of the lower ring permanent magnet 55, a lower end surface of the yoke is closely attached to an upper end surface of the lower disc 66 in the supporting frame 6 by mechanical means. The torsional control coil 59 is wound around stator poles of the torsional stator 53 and does not make contact with the metal flywheel rotor 21. An axial clearance of 3-5 mm is left between the torsional stator 53 and the radial stator 51, that is, an axial clearance of 3-5 mm is left between the lower end surface of the upper ring permanent magnet 54 and the upper end surface of the lower ring permanent magnet 55 to facilitate wiring of an upper axial control coil 57 and a lower axial control coil 58. An axial clearance of 3-5 mm is left between a lower end surface of the lower disc 66 in the supporting frame 6 and the metal flywheel rotor 21 to facilitate position detection of the axial sensor and wiring of the torsional control coil 59. The torsional control coil 59 is accommodated in the bowl bottom empty slot layer 214, and an air gap of 0.5 mm is left between a pole arc end surface of the torsional stator 53 and the bottom of the bowl bottom empty slot layer 214 (the torsional air gap is 0.5 mm).

The axial stator 52 has an upper stator salient pole and a lower stator salient pole, an outer side surface of a pole arc end of the upper stator salient pole is a cylindrical surface, an outer side surface of a pole arc end of the lower stator salient pole is a hemispherical surface, and an axial thrust disc 212 is located between the upper stator salient pole and the lower stator salient pole, where the outer side surface of the pole arc end of the lower stator salient pole shares a sphere center with a slot surface of the sphere empty slot layer 213. In the radial direction, a clearance of 3 mm is left between the outer side surface of the pole arc end of the upper stator salient pole and an inner wall of the bowl opening empty slot layer 211, and a clearance of 3 mm is also left between the outer side surface of the pole arc end of the lower stator salient pole and the slot surface of the sphere empty slot layer 213, both aiming to better optimize the magnetic path. In the axial direction, an air gap of 0.5 mm is left between both the lower end surface of the pole arc end of the upper stator salient pole and the upper end surface of the pole arc end of the lower stator salient pole and the axial thrust disc 212 (the upper axial air gap and the lower axial air gap are both 0.5 mm). The inner diameter of the axial thrust disc 212 is equal to inner diameters of the pole arc ends of the upper stator salient pole and the lower stator salient pole.

The upper axial control coil 57 and the lower axial control coil 58 are placed inside the axial stator 52, an upper coil rack 571 and a lower coil rack 581 are disposed between the upper stator salient pole and the lower stator salient pole, and the upper axial control coil 57 and the lower axial control coil 58 are respectively internally disposed in the upper coil rack 571 and the lower coil rack 581. Upper and lower ends of the upper coil rack 571 and the lower coil rack 581 are respectively closely attached to upper and lower inner walls of the axial stator 52. The upper coil rack 571, the lower coil rack 581, the upper axial control coil 57, and the lower axial control coil 58 all do not make contact with the axial thrust disc 212, The number of turns of the upper axial control coil 57 and the lower axial control coil 58 is determined according to the maximum axial bearing force (generally for offsetting the gravity of the flywheel) required by the axial magnetic bearing, so as to determine the axial length of the axial stator 52 and meanwhile decide the axial thickness of the axial thrust disc 212.

An inner diameter and an outer diameter of the upper ring permanent magnet 54 are respectively equal to an inner diameter and an outer diameter of the lower ring permanent magnet 55. An outer upper end surface of the axial stator 52 is flush with an upper end surface of the upper ring permanent magnet 54, an outer lower end surface of the axial stator 52 is flush with a lower end surface of the lower ring permanent magnet 55, and the outer lower end surface of the axial stator 52 is tangent to a hemispherical surface on the outer side of the pole arc end. An inner sidewall of the axial stator 52 is closely attached to outer sidewalls of the upper ring permanent magnet 54 and the lower ring permanent magnet 55, that is, an inner diameter of the axial stator 52 is equal to the outer diameters of the upper ring permanent magnet 54 and the lower ring permanent magnet 55, The upper ring permanent magnet 54 and the lower ring permanent magnet 55 are both magnetized in the radial direction.

Leading-out paths of the control coils of the five-degree-of-freedom magnetic bearing are all provided by the control coil bus outlet hole 1113. The specific leading-out manner is: a lead of the radial control coil 56 of the five-degree-of-freedom magnetic bearing passes through the radial control coil wiring outlet holes 61 in the supporting frame 6, leads of the upper axial control coil 57 and the lower axial control coil 58 pass through the axial control coil wiring outlet holes 62 in the supporting frame 6, a lead of the torsional control coil 59 passes through the torsional control coil wiring outlet holes 63 in the supporting frame 6, and finally the leads of all the control coils are drawn to an external control power supply through the control coil bus outlet hole 1113, and the control power supply applies a control current to the control coils.

Figure 9:
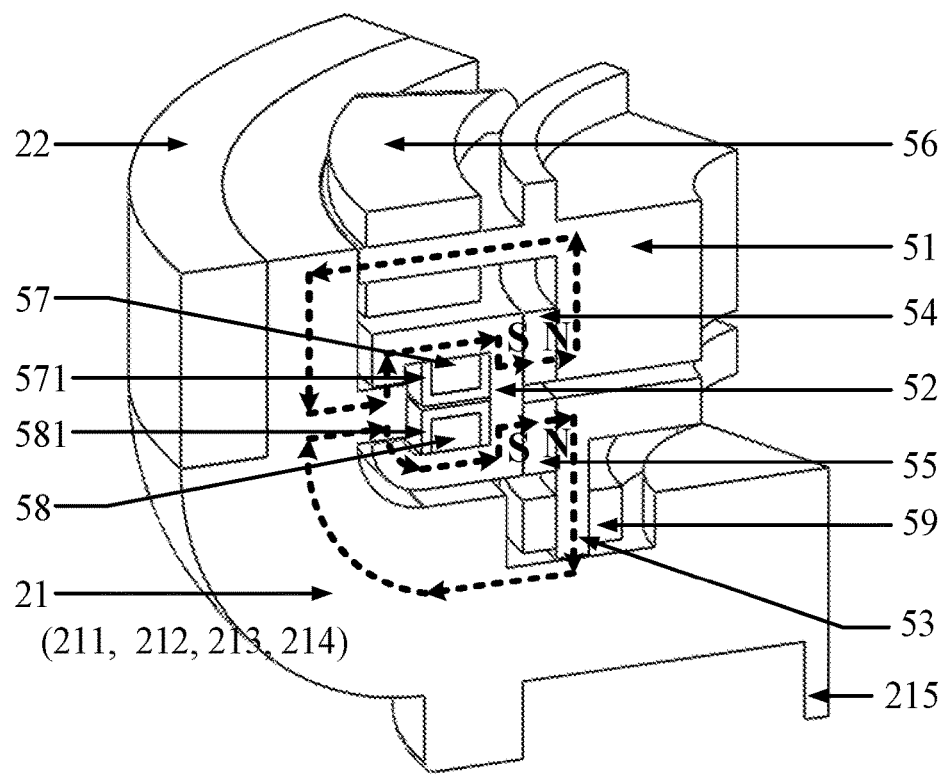
FIG. 9 is a diagram illustrating the principle of realizing static passive magnetic suspension of the five-degree-of-freedom magnetic bearing during operation of the present invention.

During operation, the five-degree-of-freedom magnetic bearing in the present invention can realize static passive magnetic suspension, two-degree-of-freedom radial magnetic suspension, two-degree-of-freedom torsional magnetic suspension, and single-degree-of-freedom axial magnetic suspension of the flywheel rotor. Static biased fluxes generated by the upper ring permanent magnet 54 and the lower ring permanent magnet 55 are collectively represented by thick dashed lines and arrows; control fluxes generated by the radial control coil 56, the upper axial control coil 57, the lower axial control coil 58, and the torsional control coil 59 are collectively represented by thick solid lines and arrows. The specific realization is as follows:

Realization of static passive magnetic suspension: as shown in FIG. 9, a biased flux generated by the upper ring permanent magnet 54 starts from its own N pole, passes through the yoke of the radial stator 51, the stator pole of the radial stator 51, the radial air gap, the bowl opening of the metal flywheel rotor 21, the axial thrust disc 212, the upper axial air gap, and the upper stator salient pole of the axial stator 52, and finally returns to its own S pole. Similarly, a biased flux generated by the lower ring permanent magnet 55 starts from its own N pole, passes through the yoke of the torsional stator 53, the stator pole of the torsional stator 53, the torsional air gap, the bowl bottom of the metal flywheel rotor 21, the axial thrust disc 212, the lower axial air gap, and the lower stator salient pole of the axial stator 52, and finally returns to its own S pole. Therefore, the five-degree-of-freedom magnetic bearing in the present invention is a composite magnetic bearing where axial, radial, and torsional biased fluxes are reused. When the flywheel is at a central balanced position, air gap fluxes in the radial air gap, the axial air gaps (including the upper axial air gap and the lower axial air gap), and the torsional air gap all do not change and remain in a mutually cancelling state, so that the flywheel is under balanced electromagnetic force with five degrees of freedom, thereby realizing static passive magnetic suspension of the flywheel rotor during rotation of the flywheel.

Figure 10:
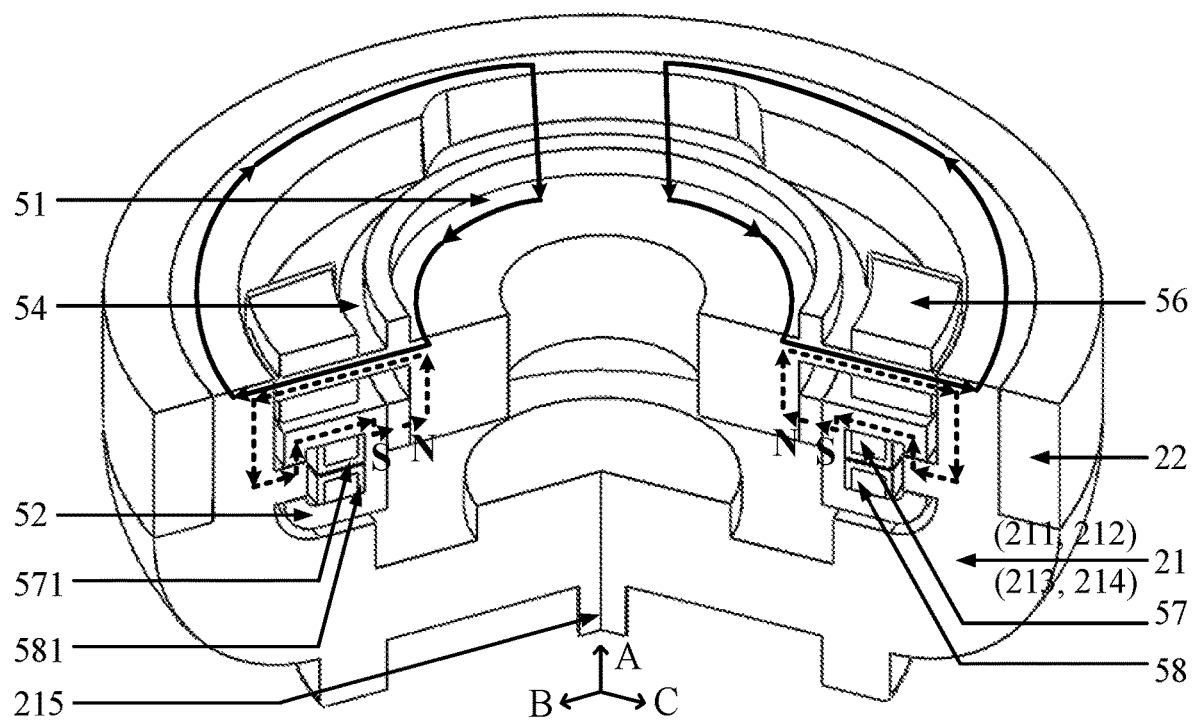
FIG. 10 is a diagram illustrating the principle of realizing two-degree-of-freedom radial balance control during operation of the present invention.

Realization of two-degree-of-freedom radial magnetic suspension: as shown in FIG. 10, the path of the biased flux generated by the upper ring permanent magnet 54 has been mentioned above, and a control flux generated by the radial control coil 56 passes through the yoke of the radial stator 51, the stator poles of the radial stator 51, the radial air gap, and the bowl opening of the metal flywheel rotor 21, and finally forms a loop between every two of the three radial stator poles. A coordinate system in A, B, and C directions is established in a radial plane, respectively corresponding to the three radial stator poles. When the flywheel rotor is offset under disturbance in the A direction with two radial degrees of freedom at a time point, the radial control coil 56 is driven using a three-phase inverter and is supplied with a three-phase alternating current, and the magnitude of the current of the radial control coil 56 is changed to generate a radial control flux, which is subjected to vector superposition with the biased flux generated by the upper ring permanent magnet 54 (the same direction of the thick dashed line and the thick solid line represents flux superposition, and the opposite direction represents flux cancellation) to realize a synthetic magnetic pull in the negative A direction, so that the flywheel rotor recovers to a radial balanced position. Similarly, the operating principles of offset in B and C directions are the same as above.

Figure 11:
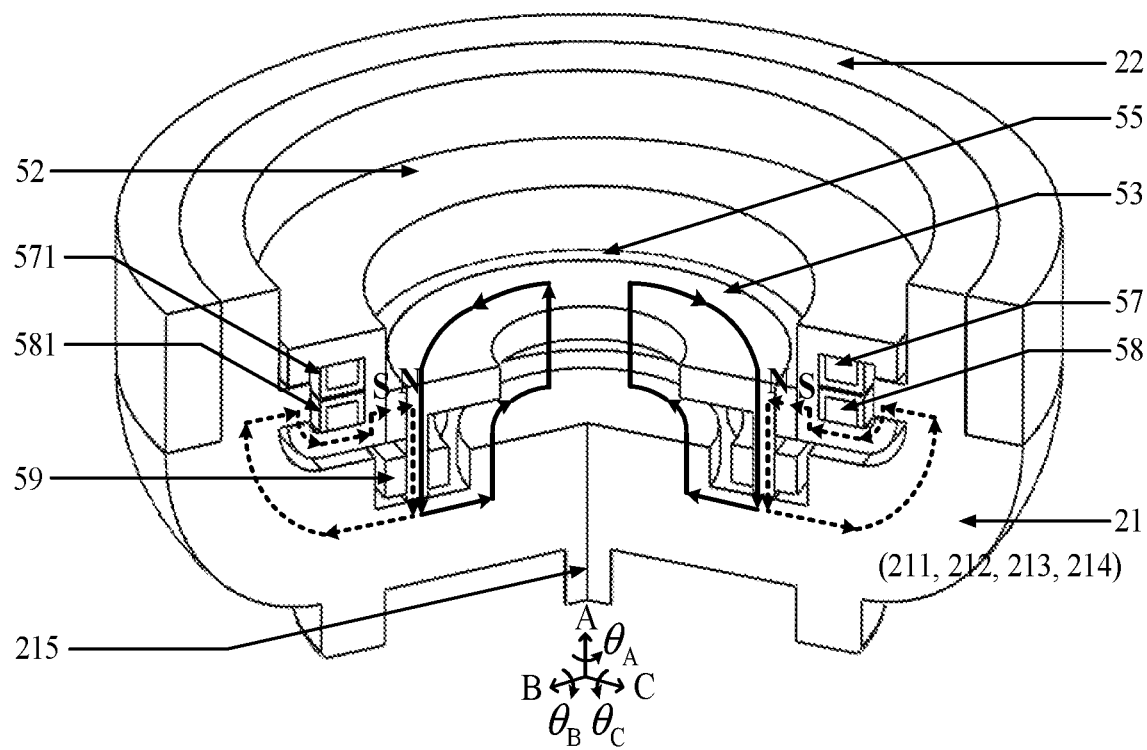
FIG. 11 is a diagram illustrating the principle of realizing two-degree-of-freedom torsional balance control during operation of the present invention.
Figure 12:
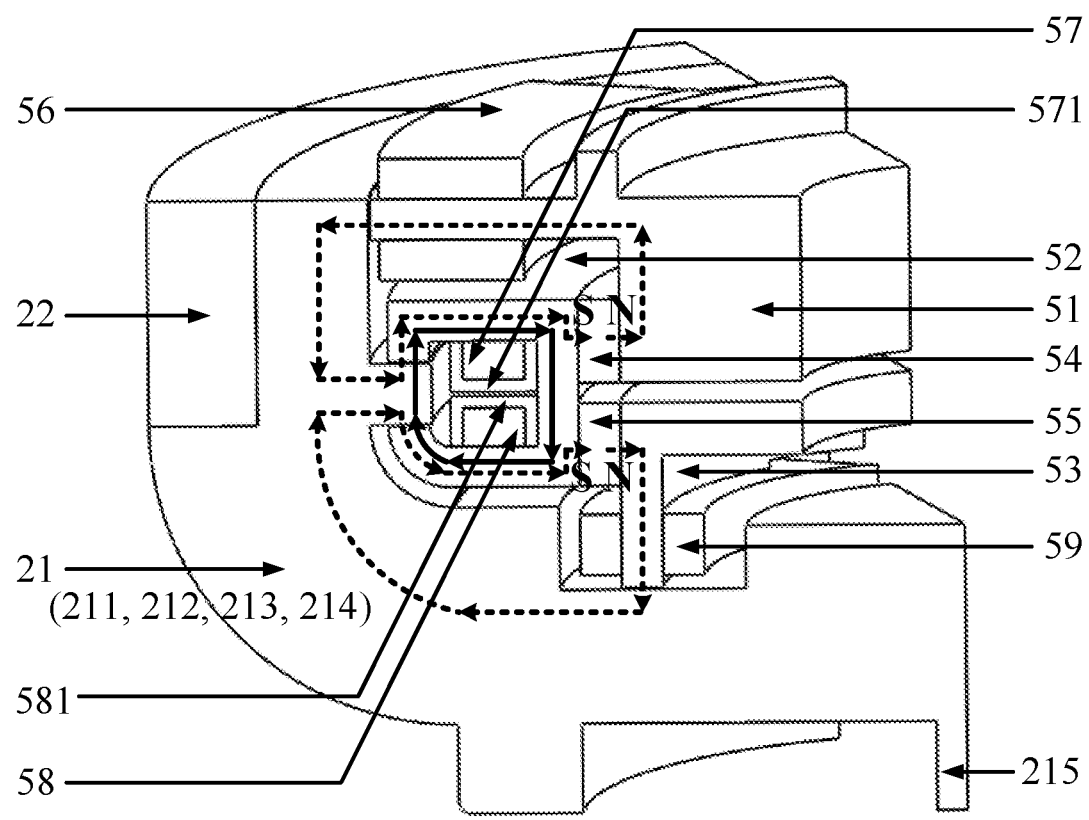
FIG. 12 is a diagram illustrating the principle of realizing single-degree-of-freedom axial balance control during operation of the present invention.

Realization of two-degree-of-freedom torsional magnetic suspension: as shown in FIG. 11, the path of the biased flux generated by the lower ring permanent magnet 55 has been mentioned above, and a control flux generated by the torsional control coil 59 passes through the yoke of the torsional stator 53, the stator poles of the torsional stator 53, the torsional air gap, and the bowl bottom of the metal flywheel rotor 21, and finally forms a loop between every two of the three torsional stator poles. Similarly, a coordinate system in A, B, and C directions is established in a torsional plane using the radial plane as a reference plane, respectively corresponding to the three torsional stator poles. When the flywheel rotor has torsion under $\theta_A$ disturbance in the A direction with two torsional degrees of freedom at a time point, the torsional control coil 59 is driven using a three-phase inverter and is supplied with a three-phase alternating current, and the magnitude of the current of the torsional control coil 59 is changed to generate a torsional control flux, which is subjected to vector superposition with the biased flux generated by the lower ring permanent magnet 55 (the same direction of the thick dashed line and the thick solid line represents flux superposition, and the opposite direction represents flux cancellation) to realize an upward magnetic pull in the A direction and a downward magnetic pull in the negative A direction. That is, the generated synthetic magnetic pull increases the air gap of the flywheel rotor at a tilt toward $\theta_A$ and decreases the air gap at a tilt toward negative $\theta_A$, which finally realizes two-degree-of-freedom torsional magnetic suspension of the flywheel rotor. Similarly, the operating principles of torsion at $\theta_B$ and $\theta_C$ in B and C directions are the same as above.

Realization of single-degree-of-freedom axial magnetic suspension: as shown in FIG, 12, the paths of the biased fluxes generated by the upper ring permanent magnet 54 and the lower ring permanent magnet 55 have been mentioned above, and currents in the same direction are applied to the upper axial control coil 57 and the lower axial control coil 58, so that a generated control flux passes through the main part of the axial stator 52, the lower stator salient pole of the axial stator 52, the lower axial air gap, the axial thrust disc 212, the upper stator salient pole of the axial stator 52, and the upper axial air gap, and finally forms a loop between two sets of axial coils. When the flywheel rotor is offset under upward disturbance with a single axial degree of freedom at a time point (that is, the upper axial air gap is deceased and the lower axial air gap is increased), a direct current is supplied to the upper axial control coil 57 and the lower axial control coil 58, and the direction and magnitude of the current of the upper axial control coil 57 and the lower axial control coil 58 are changed to generate an axial control flux, which is subjected to vector superposition with the biased fluxes generated by the upper ring permanent magnet 54 and the lower ring permanent magnet 55 (the same direction of the thick dashed line and the thick solid line represents flux superposition, and the opposite direction represents flux cancellation) to realize a synthetic magnetic pull that is downward in the axial direction, so that the upper axial air gap is deceased and the lower axial air gap is increased, and finally the flywheel rotor recovers to the axial balanced position. Similarly, the operating principles of offset under downward disturbance in the axial direction are the same as above.

During operation of the flywheel energy storage device in the present invention, the flywheel rotor operating at high speed performs mutual conversion between mechanical kinetic energy and electric energy, and the whole system can realize the input, storage, and output process of electric energy. The specific operating mode can be divided into three stages: the first is a charging and energy storage stage in which electric energy is converted by a power converter, then the drive motor 3 operates, the drive motor 3 drives the flywheel to rotate at higher speed, and the flywheel stores energy in the form of kinetic energy in the flywheel body that rotates at high speed to complete the energy storage process of converting "electric energy into mechanical kinetic energy" so as to realize input and energy storage of electric energy. The second is a constant-speed operation stage in which after the energy is stored, the drive motor 3 maintains a constant rotation speed until a control signal indicating energy release is received. In this process, energy conversion is not performed, that is, charging or discharging is not realized, and the flywheel operates at constant speed. The third is a discharging and energy release stage in which the flywheel rotating at high speed outputs energy to drives the motor to generate power, and electric energy suitable for a load is output by the power converter, to complete the energy release process of converting "mechanical kinetic energy into electric energy". During operation of the whole device, regardless of the operating state of the flywheel rotor, the "tumbler-type" flywheel rotor designed in the present invention has excellent self-stabilizing performance, which can realize self-balance using a gyroscopic effect during low-speed operation and inhibit the gyroscopic effect during high-speed operation.

The present invention can be implemented according to the above description. Other changes and modifications made by those skilled in the art without departing from the spirit and protection scope of the present invention still fall within the protection scope of the present invention.

What is claimed is:

1. A tumbler-type vehicle-mounted flywheel energy storage device with a five-degree-of-freedom magnetic suspension support, having a shell cavity and a five-degree-of-freedom magnetic bearing concentrically disposed within the shell cavity, wherein the five-degree-of-freedom magnetic bearing has an outer rotor, an inner stator, coils, and permanent magnets, a flywheel is used as the outer rotor, and the inner stator is concentrically fitted inside the flywheel, wherein the flywheel is formed into a bowl by a metal flywheel rotor and a composite material ring by means of interference fit, the metal flywheel rotor comprises an upper-section ring, a mid-section hollow hemisphere, and a lower-section ring, the composite material ring is closely fitted outside the upper-section ring to form a bowl-shaped bowl opening part, the mid-section hollow hemisphere forms a bowl-shaped bowl bottom part, and the lower-section ring forms a bowl-shaped bowl base part; an annular axial thrust disc protrudes inward in a radial direction from an inner wall on a bottom end of the upper-section ring, an area above the axial thrust disc is a bowl opening empty slot layer, an area below the axial thrust disc-is a sphere empty slot layer and a bowl bottom empty slot layer in sequence, the bowl opening empty slot layer, the sphere empty slot layer, and the bowl bottom empty slot layer, are connected from top to bottom to form an inner cavity of the flywheel, a supporting frame and the inner stator, the coils, and the permanent magnets of the five-degree-of-freedom magnetic bearing are accommodated in the inner cavity of the flywheel, the supporting frame comprises an upper cylinder and a lower disc, and has an upper end fixedly connected to the shell cavity, and is fixedly fitted in the inner stator; an outer diameter of the lower-section ring is smaller than an inner diameter of the upper-section ring, a solid bowl base central shaft is right in the middle of the lower-section ring, a bowl base annular cavity is formed between the bowl base central shaft and the lower-section ring, and a drive motor is accommodated in the bowl base annular cavity.

2. The tumbler-type vehicle-mounted flywheel energy storage device with the five-degree-of-freedom magnetic suspension support according to claim 1, wherein the composite material ring is flush with an upper surface of the upper-section ring of the metal flywheel rotor, an outer diameter of the composite material ring is equal to an outer diameter of the mid-section hollow hemisphere, so that an outer wall of the composite material ring is tangent to an outer spherical surface of the mid-section hollow hemisphere, a spherical wall thickness of the hollow hemisphere is equal to a thickness of the bowl opening part, a lower end surface of the composite material ring is flush with an upper end surface of the mid-section hollow hemisphere, and a mass ratio of the composite material ring to the metal flywheel rotor is 1:3.

3. The tumbler-type vehicle-mounted flywheel energy storage device with the five-degree-of-freedom magnetic suspension support according to claim 1, wherein a solid middle circular boss protrudes upward right in the middle of a bottom of the bowl bottom empty slot layer, so that the bowl bottom empty slot layer-is ring-shaped, and an outer diameter of the bowl bottom empty slot layer is smaller than an inner diameter of the axial thrust disc.

4. The tumbler-type vehicle-mounted flywheel energy storage device with the five-degree-of-freedom magnetic suspension support according to claim 1, wherein the drive motor comprises a motor rotor, motor permanent magnet patches, a motor stator, a motor coil, a motor supporting frame, and an auxiliary bearing, wherein an outer wall of the motor rotor is closely nested with an inner wall of the lower-section ring of the metal flywheel rotor, the motor permanent magnet patches are uniformly arranged in a circumferential direction on an inner wall of the motor rotor, the motor coil is wound around stator poles of the motor stator, the motor supporting frame is concentrically fitted on the bowl base central shaft by means of the auxiliary bearing, a yoke of the motor stator is fixedly connected to the motor supporting frame, and the motor supporting frame is fixedly connected to the shell cavity.

5. The tumbler-type vehicle-mounted flywheel energy storage device with the five-degree-of-freedom magnetic suspension support according to claim 1, wherein the shell cavity comprises a shell upper end cover, a shell outer layer wall, a shell inner layer honeycomb shield, and a shell lower end cover, wherein the shell inner layer honeycomb shield is coaxially and closely fitted in the shell outer layer wall, an upper end surface and a lower end surface of the shell outer layer wall-are fixedly connected to the shell upper end cover and the shell lower end cover respectively, the lower end cover is a solid disc surface, and a bottom wall of the shell upper end cover is concentrically and fixedly connected right in the middle to the supporting frame.

6. The tumbler-type vehicle-mounted flywheel energy storage device with the five-degree-of-freedom magnetic suspension support according to claim 1, wherein a sidewall of the upper cylinder is provided with radial control coil wiring outlet holes and axial control coil wiring outlet holes, a lower axial sensor hole is arranged in a center of the lower disc, and two fan-shaped torsional control coil wiring outlet holes are arranged symmetrically on two sides of the lower axial sensor hole.

7. The tumbler-type vehicle-mounted flywheel energy storage device with the five-degree-of-freedom magnetic suspension support according to claim 1, wherein the inner stator of the five-degree-of-freedom magnetic bearing comprises a radial stator, an axial stator, and a torsional stator, wherein the radial stator is accommodated in the bowl opening empty slot layer, a yoke of the radial stator is closely fitted outside the upper cylinder, an upper ring permanent magnet is closely attached to an outer wall of the yoke, an upper radial stator ring fixedly connected to the shell cavity protrudes upward in an axial direction from an upper end surface of the radial stator, and a radial control coil is wound around stator poles of the radial stator; the torsional stator is below the radial stator, a lower ring permanent magnet is fitted outside an outer wall of a yoke of the torsional stator, an inner wall of the yoke is closely nested with the upper cylinder, a torsional control coil is wound around stator poles of the torsional stator, and the torsional control coil is accommodated in the bowl bottom empty slot layer; the axial stator has an upper stator salient pole and a lower stator salient pole, an outer side surface of a pole arc end of the upper stator salient pole is a cylindrical surface, an outer side surface of a pole arc end of the lower stator salient pole is a hemispherical surface, the axial thrust disc is located between the upper stator salient pole and the lower stator salient pole, and the outer side surface of the pole arc end of the lower stator salient pole shares a sphere center with a slot surface of the sphere empty slot layer; and an upper axial control coil and a lower axial control coil-are placed inside the axial stator.

8. The tumbler-type vehicle-mounted flywheel energy storage device with the five-degree-of-freedom magnetic suspension support according to claim 7, wherein the upper ring permanent magnet and the lower ring permanent magnet have equal inner diameters and equal outer diameters and are both magnetized in the radial direction, an upper end surface of the yoke of the radial stator and upper end surfaces of stator poles of the radial stator are flush and together form the upper end surface of the radial stator, the upper end surface of the radial stator is flush with an upper end surface of the bowl opening part of the metal flywheel rotor, a lower end surface of the yoke of the radial stator is flush with a lower end surface of the upper ring permanent magnet, an upper end surface of the yoke of the torsional stator is flush with an upper end surface of the lower ring permanent magnet, the inner diameter of the axial thrust disc is equal to inner diameters of the pole arc ends of the upper stator salient pole and the lower stator salient pole, an outer upper end surface of the axial stator is flush with an upper end surface of the upper ring permanent magnet, an outer lower end surface of the axial stator is flush with a lower end surface of the lower ring permanent magnet, and an inner sidewall of the axial stator is closely attached to outer sidewalls of both the upper ring permanent magnet and the lower ring permanent magnet.

9. The tumbler-type vehicle-mounted flywheel energy storage device with the five-degree-of-freedom magnetic suspension support according to claim 7, wherein a radial air gap is left between a pole arc end surface of the radial stator and an inner sidewall of the bowl opening part of the metal flywheel rotor, an axial clearance is left between the torsional stator and the radial stator, an axial clearance is left between a lower end surface of the lower disc in the supporting frame and the metal flywheel rotor, a torsional air gap is left between a pole arc end surface of the torsional stator and the bottom of the bowl bottom empty slot layer, a clearance is left between the outer side surface of the pole arc end of the upper stator salient pole of the axial stator and an inner wall of the bowl opening empty slot layer, a clearance is also left between the outer side surface of the pole arc end of the lower stator salient pole and the slot surface of the sphere empty slot layer, and an axial air gap is left between both a lower end surface of the pole arc end of the upper stator salient pole and an upper end surface of the pole arc end of the lower stator salient pole and the axial thrust disc.

10. The tumbler-type vehicle-mounted flywheel energy storage device with the five-degree-of-freedom magnetic suspension support according to claim 5, wherein an outer circumferential surface of the shell outer layer wall is provided with annular heat dissipation concave rings, a sidewall of the shell outer layer wall is provided with radial sensor holes, the shell upper end cover is provided with torsional sensor holes, an upper axial sensor hole, a control coil bus outlet hole, and a vacuumization hole, and heat dissipation slots are uniformly arranged around an edge of an upper end surface of the shell upper end cover.

* * * * *